(12) United States Patent
Locatelli et al.

(10) Patent No.: US 9,306,844 B2
(45) Date of Patent: Apr. 5, 2016

(54) ZERO-CYCLE ROUTER FOR NETWORKS ON-CHIP

(71) Applicant: STMicroelectronics (Grenoble 2) SAS, Grenoble (FR)

(72) Inventors: Riccardo Locatelli, Fontanil (FR); Esa Petri, Ponsacco (IT); Antonio-Marcello Coppolla, Sassenage (FR); Luca Fanucci, Montecatini Terme Pt (IT); Sergio Saponara, Pisa (IT); Tony Bacchillone, Pisa (IT)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 658 days.

(21) Appl. No.: 13/673,505

(22) Filed: Nov. 9, 2012

(65) Prior Publication Data

US 2013/0136129 A1    May 30, 2013

(30) Foreign Application Priority Data

Nov. 9, 2011 (EP) .................................... 11306458

(51) Int. Cl.
| | |
|---|---|
| H04L 12/28 | (2006.01) |
| H04L 12/741 | (2013.01) |
| H04L 12/775 | (2013.01) |
| H04L 12/931 | (2013.01) |
| H04L 12/933 | (2013.01) |
| H04L 12/721 | (2013.01) |
| H04L 12/773 | (2013.01) |

(52) U.S. Cl.
CPC ................ *H04L 45/74* (2013.01); *H04L 45/58* (2013.01); *H04L 49/109* (2013.01); *H04L 49/70* (2013.01); *H04L 45/34* (2013.01); *H04L 45/60* (2013.01)

(58) Field of Classification Search
None
See application file for complete search history.

(56) References Cited

U.S. PATENT DOCUMENTS 6,606,326 B1* 8/2003 Herring .......................... 370/412

OTHER PUBLICATIONS

Kim J et al: "Microarchitecture of a High-Radix Router", Computer Architecture, 2005. ISCA '05. Proceedings. 32nd International Symposium on Madison, WI, USA Jun. 4-8, 2005, Piscataway, NJ, USA,IEEE, Jun. 4, 2005, pp. 420-431, XP01 0807924, 001: 10.11 09/ISCA.2005.35, ISBN: 978-0-7695-2270-8.*
Peh L-S et al: "A delay model and speculative architecture for pipelined routers", High-Performance Computer Architecture, 2001. HPCA. The Seventh Intern Ational Symposium on Monterrey, Mexico Jan. 19-24, 2001, Los Alamitos, CA, USA,IEEE Comput. Soc, US, Jan. 19, 2001, pp. 255-266, XP01 0531691, 001: 10.11 09/HPCA.2001.903268 ISBN.*

(Continued)

*Primary Examiner* — Mounir Moutaouakil
(74) *Attorney, Agent, or Firm* — Seed IP Law Group PLLC (57) ABSTRACT

A router includes a plurality of virtual networks, a plurality of output links, at least one decoder and arbitration circuitry. Each virtual network has a plurality of virtual network inputs and a plurality of virtual network outputs. Each virtual network output is associated with an output link. The decoder decodes a header of a data unit received on a virtual network of one of the virtual network inputs. The decoder generates a first request and a second request. The first request is for the allocation of a virtual network output of the virtual network to the virtual network input. The second request is for the allocation of an output link associated with the virtual network output to the virtual network output. The arbitration circuitry performs arbitration of the first request and arbitration of the second request in parallel.

20 Claims, 4 Drawing Sheets

(56) References Cited

OTHER PUBLICATIONS

European Search Report dated Apr. 17, 2013 for corresponding EP Application No. 11306458.8-1857 / 2592800, 10 pages.

Kumar et al., "A System-Level Perspective for Efficient NoC Design," IEEE International Symposium on Parallel and Distributed Processing, Miami, FL, Apr. 14-18, 2008, 3 pages.

Scott et al., "The BlackWidow High-Radix Clos Network," 33rd International Symposium on Computer Architecture, Boston, MA, 2006, 12 pages.

Tonarelli et al., "Router IP macrocell for radiation tolerant SpaceWire Networking," Ph.D. Research in Microelectronics and Electronics, Otranto, 2006, 4 pages.

Wang et al., "Recursive Partitioning Multicast: A Bandwidth-Efficient Routing for Networks-on-Chip," 3rd ACM/IEEE International Symposium on Networks-on-Chip, San Diego, CA, May 10-13, 2009, 10 pages.

Zhang et al., "Design of a performance enhanced and power reduced dual-crossbar Network-on-Chip (NoC) architecture," *Microprocessors and Microsystems 35*: 110-118, 2011.

* cited by examiner

ZERO-CYCLE ROUTER FOR NETWORKS ON-CHIP

PRIORITY CLAIM

The present application claims priority to European Patent Application No. 11306458.8 entitled "NETWORKS ON-CHIP ROUTER," filed on Nov. 9, 2011. The content of the above-identified patent document(s) is incorporated herein by reference.

TECHNICAL FIELD

The present disclosure relates generally to virtual networks and in particular but not exclusively to virtual network routers. In particular but not exclusively, the present disclosure relates to routers for networks on-chip with a virtual network support.

BACKGROUND

Technology scaling allows the integration of hundreds of functional units on the same area of an integrated circuit. The functional units may be so-called intellectual property (IP) cores and may be integrated on chip to achieve complex functionalities. These so-called multi-processor, system-on-chip (MPSoC) integrated circuits may typically provide a high level of performance.

However, in such MPSoCs, a communication infrastructure between IP cores is required to support system performance. For example, the communication infrastructure may become a bottle-neck for system performance and care should be taken when implementing the communication infrastructure.

There is, therefore, a need in the art for improved communications on multi-processor, system-on-chip integrated circuits.

SUMMARY

According to a first embodiment, a router includes a plurality of virtual networks, each virtual network having a plurality of virtual network inputs and a plurality of virtual network outputs. The router further comprises a plurality of output links, each virtual network output being associated with an output link and at least one decoder for decoding a header of a data unit received on a virtual network of one of the virtual network inputs and generating a first request for allocating a virtual network output of the virtual network to the virtual network input and a second request for allocating an output link associated with the virtual network output to the virtual network output. The router further comprises arbitration circuitry for carrying out the arbitration of the first request and the arbitration of the second request in parallel.

Each virtual network may be associated with a decoder for decoding headers of data units received on virtual network inputs of the respective each virtual network and may generate a request for allocation of a virtual network output of the respective each virtual network to the data unit. Each decoder may be further configured to generate a request for an output link associated with the requested virtual network output.

The arbitration circuitry may comprise a plurality of first arbiters, each first arbiter associated with one of the plurality of virtual networks. Each first arbiter may be configured to allocate the virtual network outputs to the virtual network inputs of the associated virtual networks in response to requests. The arbitration circuitry may further comprise a plurality of second arbiters, each second arbiter associated with one of the output links. Each output link arbiter may be configured to allocate the respective associated output link to one of the virtual networks by allocating the output link to a virtual network output from said one of the virtual networks.

The router may be configured to provide a data unit to a virtual network in response to a virtual network identifier of the packet. The virtual network identifier may correspond to a traffic class of the data unit. The virtual network identifier may correspond to a one of a request or response traffic.

Each decoder may be configured to extract the routing information from a header of the data unit. Each decoder may comprise combinational logic. Each decoder may be configured to request the allocation of a virtual network output and request the allocation of an output link corresponding to the virtual network output for each data unit in accordance with the extracted routing information.

The data unit may comprise at least one flit. The header may be contained in a first flit of the data unit. The header may be a constant size for each data unit. The header may be generated by a network interface of a network.

The first arbiter and second arbiters may comprise switches. The router may further comprise an input buffer for each virtual network input. The input buffers may be by-passable. The router may be configured to bypass an input buffer of a virtual network input when there is no contention on a virtual network output requested for the virtual network input. The virtual network router may further comprise an output buffer for each virtual network output. The output buffers may be by-passable. The virtual network router may be configured to bypass an output buffer of a virtual network output when there is no contention on an output link requested for the virtual network output.

According to a second embodiment, a network includes a network interface for communication between a functional unit and a network, with the network interface configured to determine a route of a data unit through the network and insert routing information indicative of the determined route in a header of the data unit. The network also includes a plurality of virtual network routers, each router having a plurality of virtual networks, each virtual network having a plurality of virtual network inputs and a plurality of virtual network outputs. Each of the routers further comprises a plurality of output links, each virtual network output being associated with an output link, and at least one decoder for decoding a header of a data unit received on a virtual network of one of the virtual network inputs and generating a first request for allocating a virtual network output of the virtual network to the virtual network input and a second request for allocating an output link associated with the virtual network output to the virtual network output. The router further comprises arbitration circuitry for carrying out the arbitration of the first request and the arbitration of the second request in parallel.

According to a third embodiment, a method includes determining a route of a data unit through a network and inserting routing information indicative of the determined route in a header of the data unit, routing the data unit across the network. The routing comprises inputting the data unit to one of a plurality of virtual network inputs of a virtual network in response to a virtual network indicator of the data unit, decoding a header of a data unit, and generating a first request for allocating a virtual network output of the virtual network to the virtual network input and a second request for allocating an output link associated with the virtual network output to the virtual network output. The routing further comprises arbitration circuitry for carrying out the arbitration of the first request and the arbitration of the second request in parallel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying figures, in which like reference numerals represent like parts and in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
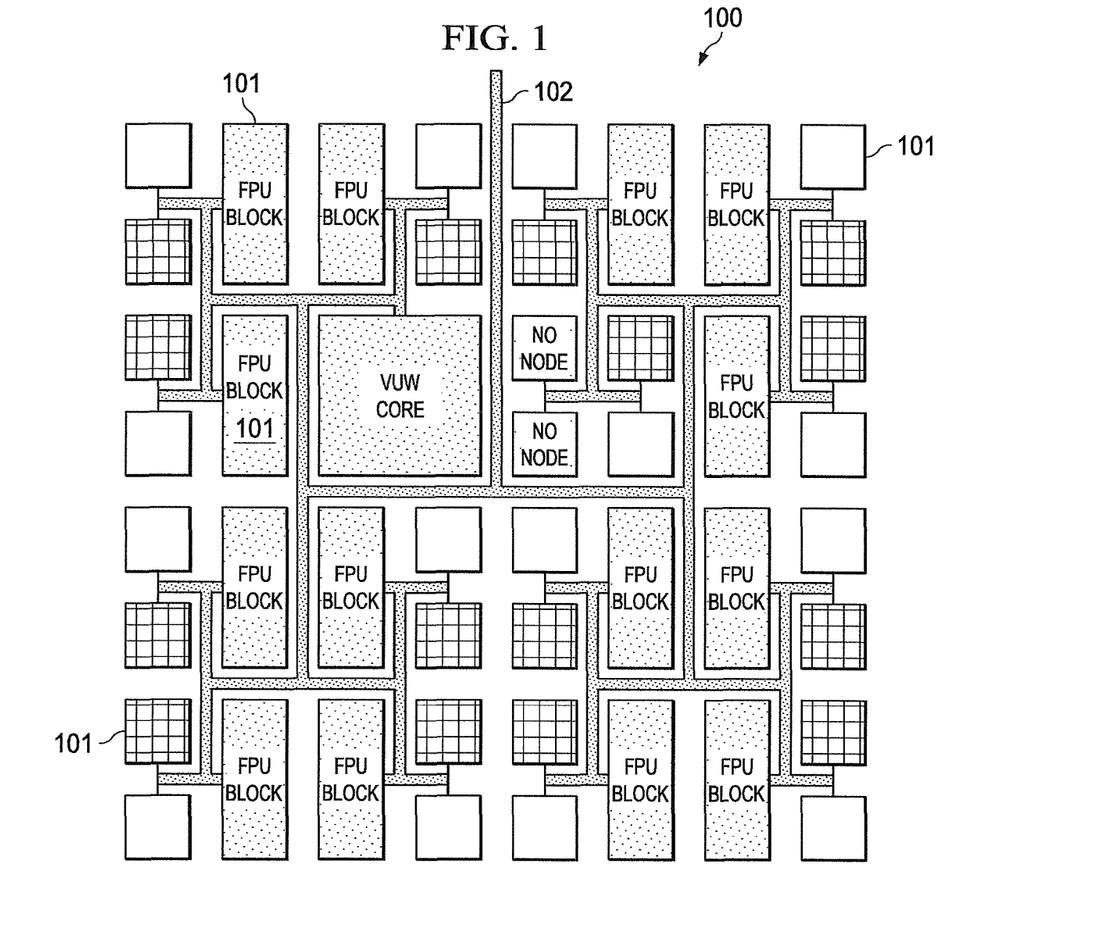
FIG. 1 depicts an example of a multiprocessor system-on-a-chip within which a router with virtual network support may be implemented in accordance with various embodiments of the present disclosure.

FIG. 1 depicts an example of a multiprocessor system-on-chip (MPSoC) within which a router with virtual network support may be implemented in accordance with various embodiments of the present disclosure. The MPSoC 100 may comprise several functional units 101. The functional units may be, for example, IP cores. The functional units 101 may be implemented on an integrated circuit and may form a system-on-chip SoC.

The MPSoC of FIG. 1 may also comprises a communication infrastructure 102. The communication infrastructure 102 may facilitate communication between the different functional units or IP cores making up the system on-chip 100. For example, the communication infrastructure may carry and route packets of data between the functional units 101.

It will be appreciated, however, that FIG. 1 is by way of example only and embodiments of the present disclosure may be applicable to a system-on-chip implemented differently than depicted in FIG. 1. For example, the system-on-chip may be implemented with different functional units, and/or with all or only some of the functional units being IP cores.

The communication infrastructure 102 of FIG. 1 may be implemented as a network-on-a-chip.

In some embodiments, the implementation of the network-on-chip may decouple the functional units 101 from a physical implementation of an infrastructure interconnecting the functional units 101. This may allow the functional units 101 to be implemented in different systems independent of the communication infrastructure used by that system. On-chip connectivity may also be enhanced by the implementation of advanced communication features by the network on-chip. For example, a network-on-chip may implement quality of service (QoS) mechanisms in some embodiments.

Figure 2:
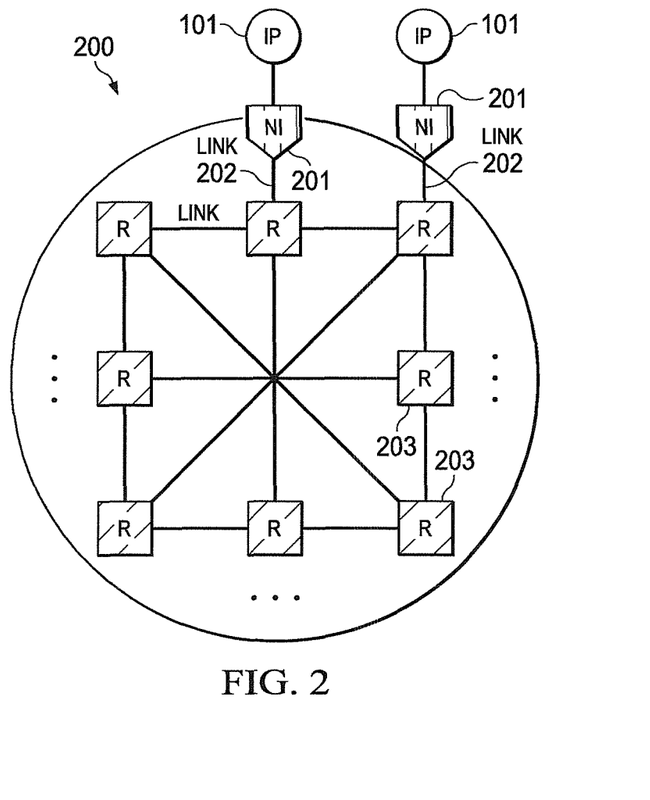
FIG. 2 depicts the routing infrastructure of the MPSoC of FIG. 1.

FIG. 2 depicts a portion of the routing infrastructure of the multi-processor network on-chip of FIG. 1. The network on-chip includes multiple functional units 101 and is capable of providing a communication for hundreds of IP cores or similar functional units. In the example shown, each functional unit 101 is directly coupled to one network interface 201, such that no intermediate device is coupled within the path between the network interface 201 and the functional unit 101. Certain functional units 101 include an IP core.

FIG. 2 shows a first and second IP core 101, each connected to a network interface 201. It will be appreciated that the two IP cores 101 are by way of example only and that the network may provide a communication for hundreds of IP cores 101. The network of FIG. 2 may comprise one or more routers 203. It will be appreciated that the number of routers in a network may be dependent on for example the communication requirements of the network and a number of functional units communicating via the network.

Each of network interfaces 201 may be connected to a router 203 by a connection 202. The connection 202 may be a physical wire implemented on an integrated circuit or may be any appropriate connection, for example an optical connection. The routers 203 may receive data to be transmitted on the network from the network interface or from other routers 203 and may transmit and route the data accordingly until the data reaches its destination.

Routers 203 may receive and transmit (or otherwise direct) packets of information. In some embodiments, large packets may be broken into smaller portions or "flits," and the data may be transmitted in such flits.

In some implementations of networks-on-chips, routers may decode an address in a packet header through use of routing tables. The decoding of addresses in such a way may necessitate the router carrying out complex functions and thus may introduce latency in the data path. These routers may also have a pipeline stage after the address decoding in order to compensate for the complexity of the address decoding.

Additionally, a packet header containing an address may be contained in a number of flits. In these cases, the router typically must wait until all the flits making up the packet header are received before an address can be decoded. This may also introduce latency into the network.

Packets that are routed through a number of routers before reaching their destination may therefore experience this latency accumulating into a significant delay. This may be undesirable in latency sensitive systems.

Some embodiments of the present disclosure may implement a network-on-chip router supporting virtual networks. In some embodiments, the network on-chip router may realize a fully combinational data path. In some embodiments, a data path may be provided with a potential zero cycle delay when there is no contention. Some embodiments of the present disclosure may provide routers that guarantee no packets are lost while still being capable of routing a packet in zero cycles.

Figure 3:
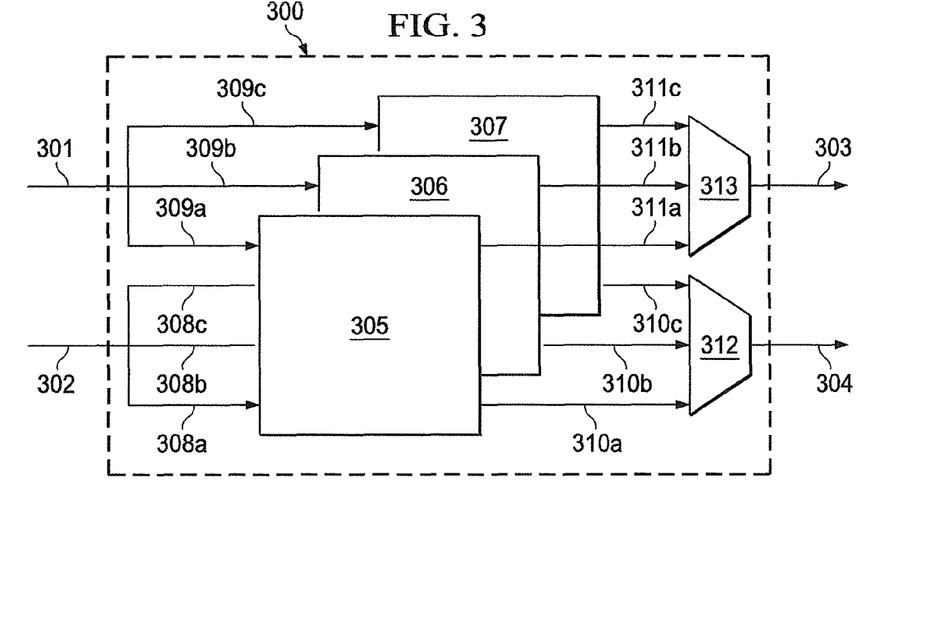
FIG. 3 is a high level block diagram of a router with virtual network support in accordance with one embodiment of the present disclosure.

FIG. 3 is a high level diagram of a router 300 with virtual network support according to an embodiment of the present disclosure. In some embodiments, the router may support a configurable number of virtual networks 305, 306 and 307.

FIG. 3 shows a router 300 with a first input 301 and a second input 302 and with a first output 303 and a second output 304. The first and second inputs 301, 302 and the first and second outputs 303, 304 may be implemented as links to other elements of the network, for example as wires connecting the router 300 to at least one other router and/or to at least one functional unit.

The router 300 may support a first virtual network 305, a second virtual network 306 and a third virtual network 307. Each virtual network 305, 306 and 306 may have virtual network inputs 308a, 308b and 308c, and 309a, 309b and 309c respectively associated with each input 301, 302 over which data associated with that network is passed from the input 301, 302. Each virtual network may have virtual network outputs 310a, 310b, 310c and 311a, 311b and 311c for passing data from that virtual network to the outputs 303, 304.

The virtual network outputs 311a, 311b and 311c may be output to a first multiplexor 313 and the virtual network outputs 310a, 310b and 310c may be connected to a second multiplexor 312. The first and second multiplexors 313 and 312 may provide outputs to a respective first and second output link 303 and 304. The output links may be output links to other network elements and implemented similarly to the input links 301 and 302.

The links coupled to the first and second inputs 301 and 302 may carry data packets. These data packets may be communication from other functional units across the network-on-chip. The data packets may be received from functional units and/or other routers. In some embodiments, the input links may receive data associated with different virtual networks. For example, a data packet for the first virtual network 305 may be associated with the virtual network input 308a and the virtual network output 311a.

When data packets are received on the first and second input links 301 and 302, the router may determine with which virtual network a packet corresponds. The packet may be provided from the input link to the determined virtual network over the corresponding virtual network input. In some embodiments, a packet may be routed to a virtual network input according to a virtual network indicator.

The router may also determine the virtual network output of that virtual network with which the packet is associated. The packet may carry information identifying which of the networks virtual network outputs that is the packet's destination. This indication may be in the form of routing information contained, for example, in a header of the packet. Each virtual network may then route the packets received on one of that virtual network's inputs to a virtual network output according to the received indication.

In some embodiments, the router 300 may carry out routing for a plurality of virtual networks. The multiplexors 313 and 312 may receive packets output from the virtual networks and multiplex such packets onto the output links 303 and 304, respectively.

In some embodiments, each of the virtual networks 305, 306 and 307 may be associated with a service class. For example, the first virtual network 305 may be associated with best effort data, the second virtual network 306 may be associated with guaranteed throughput data, and the third virtual network 307 may be associated with low priority data.

Packets on the input links 301 and 302 associated with (for example) best effort data may be input via the virtual network inputs 309a and 308a respectively to the best effort virtual network 305. Packets associated with the other service classes may be input to the respective virtual networks via the corresponding virtual network inputs.

It will be appreciated that the virtual networks described above as being associated with different service classes are by way of example only and that the virtual networks may be associated with other types or classes of network traffic. For example, in some embodiments a virtual network may be reserved for request traffic while another virtual network is reserved for response traffic.

Figure 4:
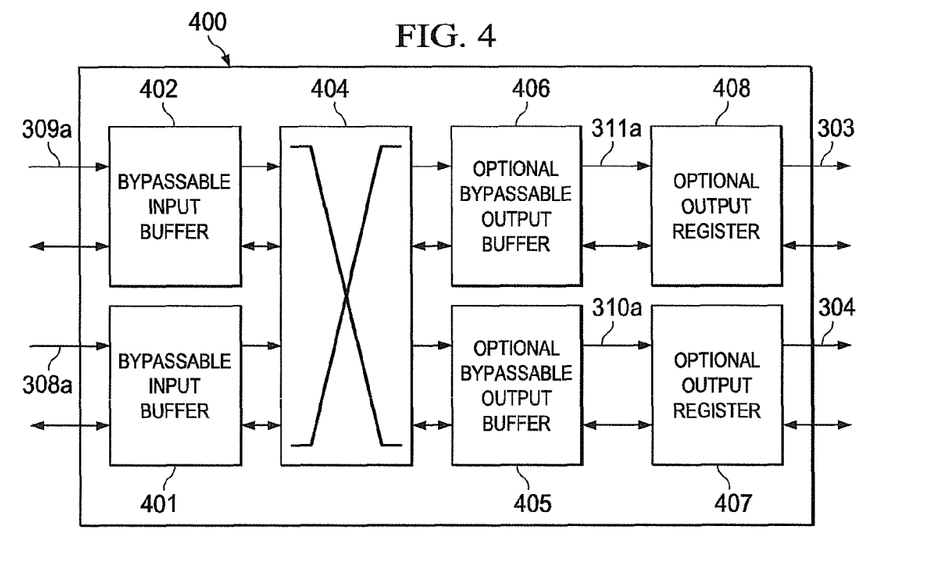
FIG. 4 depicts an example of a virtual network router in accordance with one embodiment of the present disclosure.

FIG. 4 depicts an example of a virtual network router in accordance with one embodiment of the present disclosure. For example, the subject matter illustrated in FIG. 4 may embody a router as seen from the perspective of the first virtual network 305.

FIG. 4 shows a virtual network router 400. The virtual network router 400 may have a first virtual network input 309a and a second virtual network input 308a from inputs links 302 and 301 respectively. It will be appreciated that these virtual network inputs may be the same virtual network inputs as depicted in FIG. 3, but are not limited to such correlation. The virtual network router 400 may also have a first virtual network output 311a and a second virtual network output 310a. The virtual network router may provide outputs onto an output link 303 and 304.

The virtual network inputs 309a and 308a may be input into a first and second by-passable input buffer 402 and 401 respectively. The output of each of these buffers may be connected to a switch 404 which may provide a first and second output to first and second optional by-passable output buffers 406 and 405 respectively.

The first and the second by-passable output buffers 406 and 405 may have respective outputs corresponding to the first and second virtual network outputs 311a and 310a. The first and second output registers 408 and 407 may provide an output to the first and second output links 303 and 304. It will be appreciated that the first and second virtual network outputs 311a and 310a may be multiplexed with outputs from other virtual networks onto the first and second output links 303 and 304.

The virtual network router 400 of FIG. 4 may receive packets associated with that virtual network from the first input link 301 on the virtual network input 309a and packets from the second input link 302 on the second virtual network input 308a. The virtual network router 400 may also receive an indication of the virtual network output to which the packets are to be routed.

In some embodiments, the indication of the virtual network output to which the packets are to be routed may be provided by a decoder. The decoder may receive and decode a packet header containing routing information and generate the indication of the virtual channel output based on the address information. The decoder may extract the routing information and generate routing requests to the switch for the received packet or flit. The decoder may also generate a request for an output link in parallel with the request for the virtual network output.

In some embodiments, the routing information may be contained in the first flit of a packet. In some embodiments, the first flit may contain an explicit indication of the output link on which the packet is to be output. In some embodiments, the routing information may contain an explicit indication as to which virtual channel output the packet is to be routed.

In one embodiment the network may make use of source routing. In this embodiment, a path for a packet is calculated before a packet is injected into the network. In some embodiments, the network interface may determine the path of the packet based on a destination of the packet. In this embodiment, routers such as router 400 may extract the routing information from the packet header. The information may indicate the immediate next destination for the packet, for example the next router. In this manner, the router 400 may implement combinational logic to determine routing information in the packet header.

For example, the header may contain a "path" field. The so-called "path" field may contain a list of output port identifiers, to be used by the routers crossed by the packet. When a packet arrives at the routing logic, the least significant bits of the "path" field in the header are observed. These bits may correspond to an identifier of the output port to be requested. Before outputting the packet, the router may consume or remove this information. For example, the router may perform a right shift on the "path" field so that the routing information for the next router within the path is moved into the least significant bits. The number of bits that identify the output port may depend on the total number of output ports in the router. It will be appreciated that the above-described use of the least significant bits is by way of example only, and that the routing information may alternatively be in the most significant bits (in which case a shift left may be performed).

The switch 404 may output the packets received on virtual network input 309a to the first or the second output buffer 406 and 405 according to a routing request from the decoder. Similarly the packets received on the second virtual network input 308a may be output to the first or second output buffer 406 and 405 according to a routing request from the decoder.

The packets may be buffered by the first and second bypassable output buffers 406 and 405 on the first and second virtual network outputs 311a and 310a until the first and second physical output links 304 and 303 become available. The packets may then be passed to the first and second output register 408 and 409 to be output on the first and second output links 304 and 303.

The virtual network router 400 may serve to route packets from the virtual network inputs to virtual network outputs. A virtual network input and output may be associated with a virtual channel of the router and packets may be routed according to those channels.

The first and second bypassable input buffers 402 and 401 may be used to buffer input packets when there is contention on the virtual network outputs 311a and 310a. For example, if a packet on the second virtual network input 308a and a packet on the first virtual network input 309a both request to be output on virtual network output 311a at the same time, one of the packets may be output and the other may be buffered in accordance with an output virtual network arbitration. Flits of a packet may also be buffered by the bypassable input buffers when a corresponding bypassable output buffer is full, even if there is no contention on that output. The bypassable input buffer may buffer flits of a packet until a requested output virtual channel is available.

It will be appreciated, however, that in some embodiments the router and virtual networks may be configured such that, if there is no contention on the virtual channel outputs, the bypassable input buffers may be bypassed. By bypassing the input buffers, in some embodiments a packet may traverse the switch with zero cycles.

The first and second bypassable output buffers 406 and 405 may buffer an output packet on the virtual network outputs 311a and 310a when an output link 303, 304 is not available. When the output link 303 or 304 is available, the packet on the virtual channel output 310a or to 311a may bypass the output buffer 405 or 406 to be output on the physical output link without incurring a clock cycle. In some embodiments, when there is no contention on the virtual network output and output link, a packet may traverse the data path of router 400 in zero cycles.

The buffers may receive an indication of any contention on the output links of virtual network outputs from output link and virtual network arbiters. Alternatively or additionally, the indication may be provided to other control units of the router, which may bypass the buffers in response to the indication.

In some embodiments, the bypassable input and output buffers may provide a flexible data path. The flexible data path may allow a delay of a data packet through a virtual network router to be adjustable and data packets with no contention on the virtual output network and output link may be routed in zero cycles.

In some embodiments, the output buffer may be optional. In some embodiments, the bypassable input buffers 402, 401 may provide buffering when an output link is not free and the output buffers may be removed.

In some embodiments, the first and second output registers 408 and 407 may be optional. These registers may provide retiming for the output of the data packets onto the output link. In some embodiments, this retiming may be to resynchronize the output packets with transmission timing of the network.

In some embodiments, the switch 404 may be a crossbar switch. Alternatively the switch 404 may be any connecting switch connecting multiple inputs to multiple outputs.

The router 400 may additionally comprise a decoder for decoding routing information contained in the packet. A separate decoder may be provided for each virtual network or a single decoder may be provided for more than one virtual network. The decoder may comprise decoding logic. The decoder may be connected to virtual network and link arbiters.

The virtual network of FIG. 4 may be used to route a packet, for example, as follows: The packet may be transmitted with a virtual network identifier. The virtual network identifier may be used by the router to input the packet to the correct virtual network input on the packet's arrival. The virtual network indicator may be, for example, transmitted in parallel with the packet. The virtual network indicator may be, for example, appended onto the packet when the packet is inserted into the network.

Routing information may be contained in a header of the packet. In some embodiments, the header may be contained within a first flit of the packet. On the arrival of the packet at a virtual network input, the routing information may be decoded by the decoder to determine to which output link and/or virtual network output the packet is to be routed. In some embodiments, the routing information may be used to generate requests for a virtual network output and output link.

In some embodiments, the first flit may be adjustable so that the header may be entirely contained in the first flit. In other embodiments, the header may be of a fixed size. A routing algorithm carried out at an IP block or functional unit may generate the header and in some embodiments the header may remain unchanged by the routers. The routing algorithm may be a deterministic algorithm and may carry out address decoding and other complex calculations to minimize the size of the header.

For example, the routing algorithm may determine a routing path for a packet and may insert an indicator of an output link and/or virtual network output for each router. For example, the header may contain a series of bits indicating an output link with a bit position corresponding to a router. In some embodiments, the decoder may be implemented by combinational logic to determine the virtual network output or output link for the packet.

In some embodiments of the present disclosure, data for the data packet is generated by a functional unit. The data may be passed to a network interface, which receives an indication of a destination for the packet. In some embodiments, the network interface may generate routing information for the packet and insert that routing information in the packet header. A complexity of the routing information may be minimized by performing any complex logic required for the routing algorithm in advance by the network interface. For example, the routing information may be generated to provide explicit routing information in the header of a packet.

In some embodiments, when the virtual network router 400 receives the first flit of a packet, the router extracts routing information from the packet header. This may greatly simplify the decoding of an address for a packet as the data is readily available in the first flit containing the packet header. In some embodiments, routing information may be available immediately. The routing information may be inserted in a packet header and that packet header may be contained within the first flit of a packet independent from flit size. In this manner, routing information may be available immediately to the router and complex decoding may be avoided.

Figure 5:
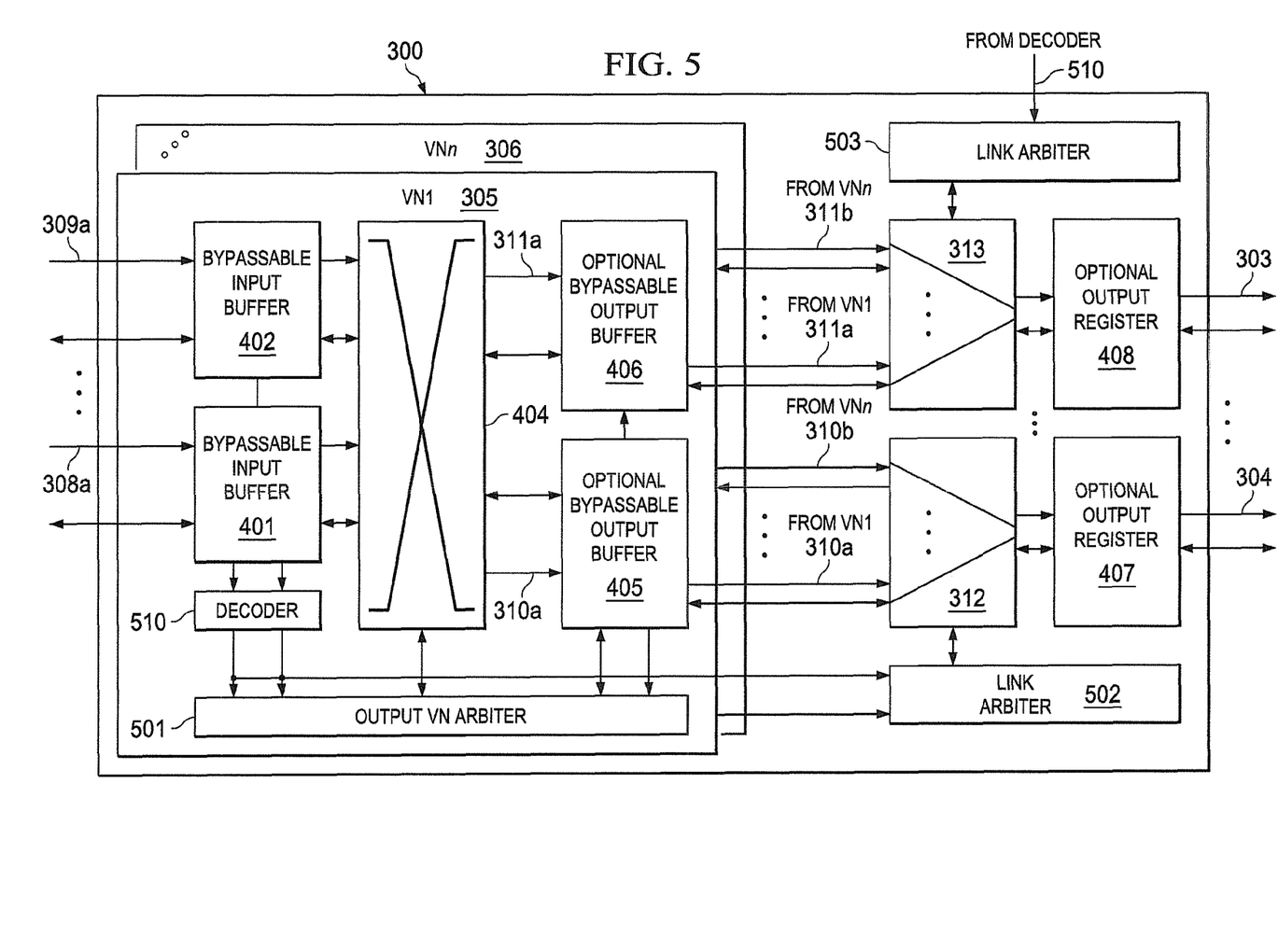
FIG. 5 depicts in greater detail portions of a router supporting virtual networks in accordance with one embodiment of the present disclosure.

FIG. 5 illustrates in greater detail portions of the router 300 supporting a number of virtual networks in accordance with one embodiment of the present disclosure. The router 300 may comprise virtual network routers 305 and 306 for each supported virtual network. The virtual network routers 305, 306 may be similar to virtual network router 400.

In FIG. 5, the router 300 receives packets on the first and second input link 301 and 302 and divides these packets up into the virtual network inputs 308a, 308b and 308c, and 309a, 309b and 309c. Virtual network inputs 308a and 309a are shown in FIG. 5. FIG. 5 also shows the first virtual network 305 and the second virtual network 306.

The first virtual network 305 comprises the first and second bypassable input buffers 402 and 401, switch 404, the first and second bypassable output buffers 406 and 405 and the first and second output registers 408 and 407 as shown in FIG. 4.

The first and second virtual network outputs 311a and 310a from the first and second bypassable output buffers 406 and 405 are output to a first and second multiplexer 313 and 312, respectively. The output of the multiplexers 313 and 312 may be input to the first and second output registers 408 and 407, respectively. The first and second output registers 408 and 407 may output the data packets on the output links 303 and 304.

In FIG. 5, an output virtual network arbiter 501 may be connected to the first and second bypassable output buffers 406 and 405. In addition, the output virtual network arbiter 501 may be connected to the switch 404. The arbiter 501 may be connected to a decoder 510 that decodes routing information for a packet. The decoder may provide requests for virtual network outputs for a virtual network input for decoded packet.

The decoder 510 may be connected to the arbiter 501 and arbiter 502, 503 and to buffers 401, 402, 405 and 406. In some embodiments, the decoder 510 may comprise a decoder for each of the virtual networks. Each of the virtual network decoders may send requests to the link arbiter for each output link requesting that output link to be allocated to a virtual network output of the virtual network. For example, a first decoder may request an output link for a virtual network output on a first virtual network and a second decoder may request an output link for a virtual network output of a second virtual network. Each of the decoders may receive packets sent to the virtual network of that decoder and decode the packet headers.

The first and second multiplexers 313 and 312 may receive the virtual network outputs associated with the other virtual networks (not shown) in addition to the first and second virtual channel outputs 311b and 310b from the second virtual network 306. It will be appreciated that the router 300 may comprise more than two virtual networks which may be similar to the first virtual network, and the multiplexer 312 and 313 will receive outputs from each of these networks.

Each of the multiplexer 313 and 312 may be associated with a link arbiter 503 and 502, respectively. The link arbiter may be connected to the decoding logic and may receive a request from the decoding logic for an output link to be allocated to a virtual network output. Each link arbiter 502, 503 may provide an input to a respective multiplexer 312 and 313.

In some embodiments, the input links 301 and 302 receive packets. A header of each packet may be contained in a first flit of the packet and the header may contain routing information. When a packet is received, the router 300 may provide that packet to one of the virtual networks based on a virtual network indicator of the packet.

Each virtual network may contain a decoder 510 for decoding a first flit of a packet containing routing information, and determining a virtual network output.

Packets on the first and second virtual network inputs 309a and 308a for the first virtual network 305 are provided to the bypassable input buffers 402 and 401, respectively. Similar to the embodiment of FIG. 4, the switch 404 determines to which virtual channel output of the first virtual network the packets on the virtual network inputs 308a and 309a are to be transferred.

In some embodiments, the output virtual network arbiter 501 receives an indication of the destinations of each of the packets. This destination indication may be in the form of a request from the decoding logic. In some embodiments, the output virtual network arbiter 501 may also receive an indication of the state of the bypassable input buffer. The output virtual network arbiter 501 may arbitrate the output of the packets to the virtual network outputs 310a and 311a, depending on a destination of a packet and a state of the bypassable input buffers.

In some embodiments, the output virtual network arbiter 501 may provide arbitration concerning virtual network output contention for the virtual network outputs within the first network. It will be appreciated that in some embodiments, when there is no output contention (in other words, packets on the virtual channel inputs 308a and 309a do not request the same virtual channel output 310a and 311a), an input buffer may be bypassed and the packet may be passed to the virtual network output. It will be appreciated that if an input buffer already contains data, the packet will be queued.

In some embodiments, each of the virtual networks provide virtual network routing for the virtual channels associated with that network. The routing may be provided similarly to the first virtual network 305. For example, in FIG. 5 virtual network 306 carries out a virtual network routing for the virtual network inputs 309b and 308b and provides virtual network outputs 311b and 310b to the first and second multiplexers 313 and 312. The inputs to the first multiplexer 313 may be destined to the output link 303 and the inputs to the second multiplexer 312 may be destined to the output link 302.

In some embodiments, a link arbiter 502 may be provided as a second level of arbitration in order to control the multiplexing of the inputs to the second multiplexer 312 to the output link 304. Similarly a link arbiter 503 may be provided to control the multiplexing of multiplexer 313 of the input virtual channel outputs from the virtual networks to the output link 303.

The decoder 510 may generate requests to the output link and virtual network arbiters after decoding the packet header. These requests may be generated in parallel and in some embodiments the output link and virtual network output may be allocated in parallel. In these embodiments, a packet may cross a virtual network in zero cycles where there is no contention because it does not need to be buffered while output link arbitration is carried out. The output link may be allocated to a virtual network output before the allocation of the virtual network output is known. If the virtual network output request was not successful the virtual network output will have been allocated to another packet and this packet will be passed to the allocated output link.

In some embodiments, the first and second output registers 408 and 407 may be provided in order to provide retiming of the flits or data packets to be output on the output links 303 and 304.

The routing information accessed in the packet header may be decoded by use of combinational logic and may be done in zero cycles.

In some embodiments, the output virtual network arbiter 501 provides the first level of arbitration. As discussed, this arbitration may be with respect to virtual network inputs requesting the same virtual channel output on a virtual network. In some embodiments, the virtual network arbiter may allocate the virtual channel per packet. For example, a flit for a packet header may be coded such that that packet is destined for the first virtual network input 309a and requests to be output on the virtual network output 310a. The output virtual network arbiter may then assign a channel from the virtual network input 309a to virtual network output 310a for that packet.

The virtual network outputs 310a and 311a may receive the arbitrated packets from the virtual network inputs 309a and 308a. These packets may be input to the multiplexer 312 and 313 along with other virtual network outputs from the other virtual networks. The link arbiters 503 and 502 may provide a second level of arbitration. These link arbiters 502 and 503 in some embodiments may control the output of data back onto the physical links 303 and 304.

In some embodiments, the virtual network arbiter may allocate virtual network outputs on a packet-by-packet basis and the output link arbiter may allocate the output links on a flit-by-flit basis. The packets from the virtual network outputs may be buffered by the output buffers.

Some embodiments in accordance with the present disclosure may implement a speculation-like technique for generating requests to the output virtual network arbiter 501 and the link arbiters 502 and 503. In these embodiments, requests to the relative output link arbiter 502 or 503 may be generated in parallel with requests to the output virtual network. This may occur at a point before a flit has acquired ownership of the virtual network.

For example, a first level of requests may be generated for the output virtual network arbiter 501 for each packet at a virtual network input, requesting one of the virtual network outputs. Each virtual network output may correspond to an input to a second level of arbitration that arbitrates for an output link. For example, a first level request for a packet may request a virtual network output corresponding to a first output link and a second level request for that packet may request the output link. The first and second level requests may be generated in parallel. If, for example, the first level request is not granted but the second level request is granted, this will be due to another packet being granted the request for the virtual network output and a packet will be present on the virtual network output input into the second level arbitration.

The second level arbitration may be carried out between requests from packets that are at the virtual network inputs and packets that have been buffered on the input to the second level of arbitration. In some embodiments, requests from buffered packets or flits and non-buffered packets or flits may be arbitrated together. This may result in a simple arbitration that allows a packet to cross the router without an incurred delay when a virtual network output and output link is available.

Figure 6:
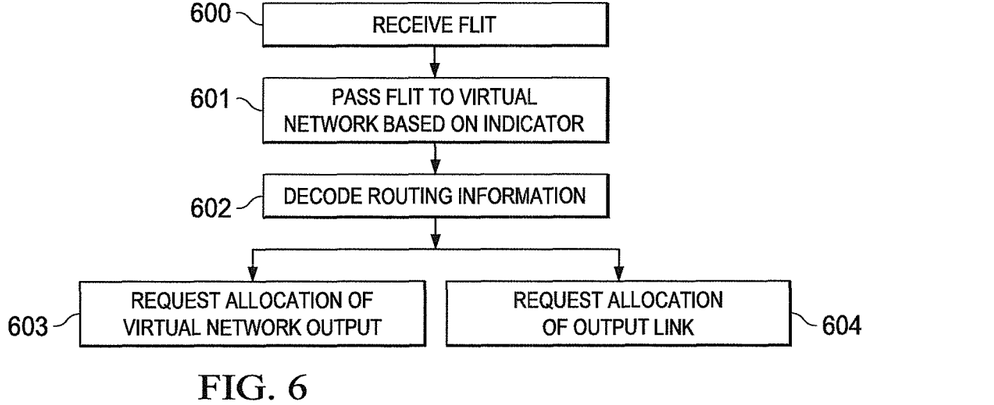
FIG. 6 is a high level flow diagram for a method performed by a router supporting virtual networks in accordance with embodiments of the present disclosure.

FIG. 6 is a high level flow diagram for a method performed by a router supporting virtual networks in accordance with embodiments of the present disclosure. At step 600, the router receives a packet. The packet may contain an indication of the virtual network with which the packet is associated. The router may pass the packet to the indicated virtual network at step 601. At step 602, a decoder 510 of the virtual network may decode routing information for the packet and determine a virtual network output and output link associated with the packet. In some embodiments, the routing information may be decoded through use of combinational logic. In some embodiments, the decoding may occur in less than a clock cycle.

Once the routing information is decoded, the decoder 510 may generate a virtual network arbitration request 603. This request may be sent to the output virtual network arbiter 501. The decoder 510 may also generate an output link request at step 604. This request may be sent to a link arbiter 502 or 503. In some embodiments, the generation of requests at step 603 and 604 may be carried out in parallel. The requests may be generated from the routing information in the packet header.

For example, when a packet is received on one of the input links, the packet is passed to a virtual network based on the virtual network indication. A decoder 510 may extract routing information from the packet header contained in the first flit and determine on which virtual network output the packet is to be output. Once the routing information has been extracted, a request may be generated to the output virtual network arbiter as well as a parallel request to the output link arbiter. In this embodiment, the request for the output link occurs before the virtual network output arbiter has allocated a virtual network output for the packet.

It may be known from the routing information which physical output link is to receive the packet to be transmitted.

Therefore, in addition to generating a request to the output virtual network arbiter, embodiments may generate the parallel request to the output link. Even though the output virtual network arbiter may not have granted the connection between the virtual channel input and output yet.

In these embodiments, although the result of the virtual network arbiter is not known, if there is no contention on the virtual network output, the virtual network output will be granted to the requesting packet. However, if there is contention on the virtual network output, even if the virtual network output is not allocated to that packet, the output will be allocated to another packet causing the contention.

Therefore in some embodiments, regardless of the results of the virtual network output arbitration, a virtual packet will be output to the virtual output channel and, hence, regardless of the results of the arbitration by the virtual network arbiter, a packet will be available on the output link to be output to that physical output link. There will be data present on a virtual network output for which the output link has been assigned in response to a request regardless of whether that packet corresponds to data from which the request was generated.

It will be appreciated that the virtual networks and virtual channels have been given by way of example only and other amounts of channels and/or virtual networks may be implemented.

In some embodiments, routing of a packet may take place in zero cycles through parallel allocation of a virtual network output and output link and combinational decoding and bypassing of any pipeline stages such as buffers when there is no contention. Embodiments may provide a purely combinational artificial path for a virtual router when there is no contention. In some embodiments, pipeline stages may be omitted.

In some embodiments, the decoder may comprise a plurality of decoders, one for each virtual network. Each of the plurality of decoders may send respective requests to the link arbiters.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A router, comprising:
    a plurality of virtual networks, each virtual network having a plurality of virtual network inputs and a plurality of virtual network outputs;
    a plurality of output links, each virtual network output associated with one of the output links;
    at least one decoder configured to decode a header of a data unit received on a first virtual network input of a first virtual network, the at least one decoder configured to generate:
        a first request to allocate a first virtual network output of the first virtual network to the first virtual network input, and
        a second request to allocate an output link associated with the first virtual network output to the first virtual network output; and
    arbitration circuitry configured to perform arbitration of the first request and arbitration of the second request in parallel, the arbitration circuitry including:
        a plurality of first arbiters, at least one first arbiter of the plurality of first arbiters associated with each one of the plurality of virtual networks, wherein each first arbiter of the plurality of first arbiters is configured to allocate the virtual network outputs to the virtual network inputs of the associated virtual networks in response to requests; and
        a plurality of second arbiters, at least one second arbiter of the plurality of second arbiters associated with each one of the output links, wherein each second arbiter of the plurality of second arbiters is configured to allocate the respective associated output link to one of the plurality of virtual networks by allocating the output link to a virtual network output from the one of the plurality virtual networks.

2. The router of claim 1, wherein each virtual network is associated with a decoder configured to decode headers of data units received on virtual network inputs of the respective each virtual network and to generate a request for allocation of a virtual network output of the respective each virtual network to the data unit.

3. The router of claim 2, wherein each decoder is further configured to generate a request for an output link associated with the requested virtual network output.

4. The router of claim 1, wherein the arbitration circuitry comprises a plurality of first arbiters, each first arbiter associated with one of the plurality of virtual networks.

5. The router of claim 4, wherein each first arbiter is configured to allocate the virtual network outputs to the virtual network inputs of the associated virtual networks in response to requests.

6. The router of claim 1, wherein the arbitration circuitry further comprises a plurality of second arbiters, each second arbiter associated with one of the output links.

7. The router of claim 6, wherein each second arbiter is configured to allocate the respective associated output link to one of the virtual networks by allocating the output link to a virtual network output from the one of the virtual networks.

8. The router of claim 1, configured to provide the data unit to a virtual network in response to a virtual network identifier of the packet.

9. The virtual network router of claim 8, wherein each decoder is configured to extract the routing information from a header of the data unit.

10. The router of claim 9, wherein each decoder is configured to request the allocation of a virtual network output and to request the allocation of an output link corresponding to the virtual network output for each data unit in accordance with the extracted routing information.

11. The router of claim 1, wherein the header is contained in a first flit of the data unit.

12. The router of claim 1, configured to bypass an input buffer of a virtual network input when there is no contention on a virtual network output requested for the virtual network input.

13. The router of claim 1, wherein the virtual network router is configured to bypass an output buffer of a virtual network output when there is no contention on an output link requested for the virtual network output.

14. A network, comprising:
    a network interface configured to provide communication between a functional unit and a network, the network interface configured to determine a route of data units through the network and to insert routing information indicative of the determined route in respective headers of the data units; and
    a plurality of virtual network routers, each router having:
        a plurality of virtual networks, each virtual network having a plurality of virtual network inputs and a plurality of virtual network outputs;

a plurality of output links, each virtual network output associated with a respective output link;

at least one decoder configured to decode a header of a data unit received on a virtual network of one of the virtual network inputs and to generate:

a first request to allocate a virtual network output of the virtual network to a virtual network input, and a second request to allocate an output link associated with the virtual network output to the virtual network output; and arbitration circuitry configured to perform arbitration of the first request and arbitration of the second request in parallel, the arbitration circuitry including:

a plurality of first arbiters, at least one first arbiter of the plurality of first arbiters associated with each one of the plurality of virtual networks, wherein each first arbiter of the plurality of first arbiters is configured to allocate the virtual network outputs to the virtual network inputs of the associated virtual networks in response to requests; and a plurality of second arbiters, at least one second arbiter of the plurality of second arbiters associated with each one of the output links, wherein each second arbiter of the plurality of second arbiters is configured to allocate the respective associated output link to one of the plurality of virtual networks by allocating the output link to a virtual network output from the one of the plurality virtual networks.

15. The network of claim 14, wherein each first arbiter of the plurality of first arbiters is associated with one of the plurality of virtual networks, and wherein each second arbiter of the plurality of second arbiters is associated with one of the output links.

16. The network of claim 14, wherein the at least one decoder is configured to request allocation of a virtual network output and to request allocation of an output link corresponding to the virtual network output for each data unit in accordance with routing information extracted from the header of the data unit.

17. A method, comprising:

determining a route of a data unit through a network and inserting routing information indicative of the determined route in a header of the data unit;

routing the data unit across the network, the routing comprising:

inputting the data unit to one of a plurality of virtual network inputs of a virtual network in response to a virtual network indicator of the data unit;

decoding the header of the data unit and generating:

a first request to allocate a virtual network output of the virtual network to a virtual network input; and a second request to allocate an output link associated with the virtual network output to the virtual network output; and performing arbitration of the first request and arbitration of the second request in parallel, the arbitration including:

performing a first arbitration with a first arbiter associated with the virtual network, the first arbitration including allocating the virtual network output to the virtual network input of the associated virtual network in response to the first request; and performing a second arbitration with a second arbiter associated with the output link, the second arbitration including allocating the output link to the virtual network by allocating the output link to the virtual network output of the virtual network in response to the second request.

18. The method of claim 17, wherein performing arbitration of the first request and arbitration of the second request in parallel comprises:

allocating with a first arbiter the virtual network output to the virtual network input in response to the first request; and allocating with a second arbiter the output link to the virtual network output in response to the second request.

19. The method of claim 17, wherein decoding the header of the data unit includes extracting routing information from the header of the data unit.

20. The method of claim 17, comprising:

bypassing an input buffer of the virtual network input when there is no contention on the virtual network output requested for the virtual network input; and bypassing an output buffer of the virtual network output when there is no contention on the output link requested for the virtual network output.

* * * * *